Oct. 23, 1934.   F. SASS ET AL   1,978,229
BOLT AND NUT CONNECTION
Filed June 20, 1932
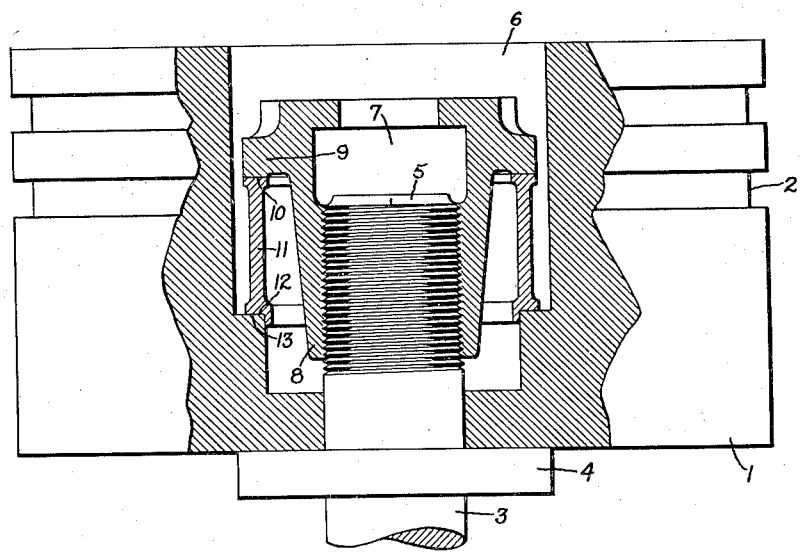
Inventors:
Friedrich Sass,
Ernst Daiber,
by Charles Mullen
Their Attorney.

Patented Oct. 23, 1934

1,978,229

UNITED STATES PATENT OFFICE 1,978,229

BOLT AND NUT CONNECTION

Friedrich Sass, Charlottenburg, and Ernst Daiber, Lichterfelde-West, Germany, assignors to General Electric Company, a corporation of New York Application June 20, 1932, Serial No. 618,374
In Germany June 24, 1931

2 Claims. (Cl. 85—32)

The present invention relates to bolt and nut connections for fastening two machine parts together, for example, the piston of a combustion engine to the piston rod.

The object of our invention is to provide an improved bolt and nut connection whereby the stresses are uniformly distributed over the entire threaded portions of the bolt and the nut and excessive stresses taken up by machine parts other than the threads.

In order to make clear the problem on which our invention is based, attention is directed to certain mechanical stresses and deformations in usual bolt and nut connections.

Two machine members can be fastened together by means of a bolt extending through holes in said members and having a head or collar bearing against one of the machine members and a nut on the other screw-threaded end of the bolt with its inner end facing the other member and bearing directly against said member. In such a connection the bolt is subject to different kinds of forces than the nut. For example, the bolt is subjected to tensile forces causing elongation thereof whereas the nut is subjected to compression causing axial shortening thereof, to the effect that different deformations with respect to the two parts take place. The deformations with respect to each individual part are not uniform, that is, with respect to the compressed nut the compression of the threaded portion near the bearing surface is greater than that of the other portion. The first effect, the different deformations of the two parts, makes it in many cases difficult to disassemble these parts and when said parts are disassembled to assemble them again. The second effect causes in many cases exceedingly high stresses in certain portions of these parts, leading to breakage thereof, a danger which is especially apparent where the connecting parts are subject to different temperatures. In all these cases it is of primary importance to provide a bolt and nut connection with the threads of the bolt and the nut subject to equal and uniformly distributed forces, and it is also important to provide safety means for the connection to take up excessive forces, applied to these parts.

This is achieved according to our invention by providing the outer portion of the nut which faces away from the bearing surface with a shouldered portion and arranging an intermediate elastic member between the shouldered portion and the bearing surface for the nut.

For a better understanding of what we consider to be novel and our invention, attention is directed to the following specification and the claims appended thereto in connection with the accompanying drawing which forms a part of our specification.

In the drawing we have shown by way of example, partly in section and partly broken away, a bolt and nut connection for fastening an engine piston to its rod.

Referring to the drawing, 1 designates a piston having grooves 2 in its outer surface for receiving piston rings. 3 is a rod shown by way of example as being provided with a collar 4 bearing against the outer wall of the piston. The upper part 5 of the rod is screw-threaded and extends into a recess 6 in the piston. The upper part of the rod including collar 4 and screw-threaded portion 5 forms in substance a bolt for fastening rod 3 to piston 1. Fastening together of these parts is accomplished in accordance with my invention by means of a nut 7 which comprises a long, internally screw-threaded body 8 engaging the screw-threaded end portion of the rod with its upper end provided with a shoulder or collar 9 bearing against the end 10 of an intermediate resilient member 11 having its other end 12 engaging a shouldered bearing surface 13 defined by the inner wall of the piston. The shoulder 9 is located axially beyond the screw-threaded portion of the body 8 and the resilient member 11 surrounds at least the upper screw-threaded portion of the body 8. The uniform distribution of stresses in the nut is further improved by making the nut of varying cross section. As will readily be seen from the drawing, the cross section increases from the lower end of the nut towards the upper shoulder portion thereof, that is, towards the portion which is suspended from or supported by the member or ring 11.

With this arrangement both the bolt, that is, the end portion of the piston rod, and the nut are subject to tensile forces, which forces are uniformly distributed among the threads. An important feature according to our invention is the provision of the intermediate elastic member 11 which serves as a safety means against excessive forces. In order to obtain the desired resiliency for the intermediate member 11 which is under compression we make this member of suitable material, for example, cast iron. If made from other material, such as steel, we provide a comparatively small cross section for the intermediate member, preferably a cross section smaller than the cross section of the core of the threaded nut and bolt portions. With such an arrangement the deformation due to the forces applied to the bolt and nut takes place at least partly in the resilient member 11 or, from another viewpoint, deformation which in an ordinary nut and bolt connection takes place in the body of the nut is transferred in the arrangement according to my invention to the resilient ring member surrounding the nut. This member accordingly forms a means for protecting the nut against excessive deformation. If excessive deformation takes place due to excessive forces applied to the bolt it is transferred primarily to the intermediate member, that is, the resilient member is deformed before the nut or any portion thereof is deformed. In case the nut is made of varying cross section, more specifically when the nut comprises a portion adjacent the fastened parts or members with a cross sectional area smaller than the nut portion remote from the fastened parts or members, I make the intermediate supporting member 11 of a cross sectional area preferably smaller than the mean cross sectional area of the nut.

With our invention we have provided a simple and reliable arrangement for a bolt and nut connection in which the threaded portions of these members are subjected to equal and uniformly distributed forces and in which excessive forces are taken up by an intermediate resilient member.

What we claim as new and desire to secure by Letters Patent of the United States, is,—

1. In a bolt and nut connection for fastening two machine parts together, a bolt, a nut on a threaded portion of the bolt having a portion remote from the fastened members provided with a shoulder, an intermediate resilient supporting member between the shoulder and a bearing surface of one of said parts for transmitting under all operating conditions the entire bolt tension from the nut to said bearing surface, said member being made of a material with greater elasticity than the material forming the nut and having a cross sectional area smaller than the cross sectional area of the nut to transfer deformation due to excessive stresses primarily to the intermediate member.

2. In a bolt and nut connection for fastening two non-elastic machine parts together, a bolt, a nut on a threaded portion of the bolt having a portion remote from the fastened parts provided with a shoulder defining a supporting surface for the nut, the nut having a cross section increasing in axial direction towards the shouldered portion throughout the length of the threaded portion to cause uniform distribution of forces among the threads of the nut, and an intermediate elastic supporting member between the shoulder and one of the fastened parts having a cross-sectional area smaller than the mean cross-sectional area of the nut to protect the nut against excessive deformation.

FRIEDRICH SASS.
ERNST DAIBER.